United States Patent [19]

Jenks

[11] 4,279,067

[45] Jul. 21, 1981

[54] WELL PUMP BREAKING TOOL

[76] Inventor: Harry E. Jenks, P.O. Box 742, Elkhart, Kans. 67950

[21] Appl. No.: 80,087

[22] Filed: Sep. 28, 1979

Related U.S. Application Data

[63] Continuation-in-part of Ser. No. 915,789, Jun. 15, 1978, Pat. No. 4,216,625.

[51] Int. Cl.³ .......................... B23P 19/00; B26F 3/00
[52] U.S. Cl. ..................................... 29/239; 29/403.3; 29/413; 29/426.4; 225/97; 225/103
[58] Field of Search ................. 29/239, 259, 264, 413, 29/426.5, 426.4, 403.3; 225/97, 103, 93

[56] References Cited

U.S. PATENT DOCUMENTS

| 4,080,887 | 3/1978 | Larsen | 29/403.3 X |
| 4,110,885 | 9/1978 | Fisher | 29/239 |
| 4,221,315 | 9/1980 | Latchague | 225/97 |

Primary Examiner—Frank T. Yost
Attorney, Agent, or Firm—Edwin H. Crabtree

[57] ABSTRACT

A well pump breaking tool for mounting on a well pump stand. The tool used in conjunction with a well pump stripping tool. The stripping tool cutting elongated slots along the length of a pump barrel surrounding a pump plunger. The well pump breaking tool is used when the pump plunger becomes seized inside the surrounding barrel due to contamination in the fluid which is pumped. The tool breaking the slotted barrel thereby releases the plunger so it may be reused.

6 Claims, 2 Drawing Figures

WELL PUMP BREAKING TOOL

CROSS REFERENCE TO RELATED APPLICATION

This application for patent is a continuation in part application of an application entitled "A Well Pump Stripping Tool and Method of Removing Well Tubing", filed June 15, 1978, and having Ser. No. 915,789, now U.S. Pat. No. 4,216,625.

BACKGROUND OF THE INVENTION

This invention relates to a breaking tool for well pump tubing, well pipe and the like and more particularly but not by way of limitation to a well pump breaking tool for removing a hollow plunger from inside a barrel of a well pump.

Heretofore, when bottom hole oil field plunger type pumps become contaminated with materials, such as fine grain gypsum pumped through the interior of the pump, the reciprocating pump plunger seizes against the interior walls of the pump barrel rendering the pump inoperable. To free the plunger from the pump barrel, the pump is often treated chemically or with mechanical force. This type of removal is time consuming, expensive and often unsuccessful. Therefore, the old well pumps are often discarded and a new pump is purchased.

Prior to the subject invention there has been no use of a well pump breaking tool such as the invention described herein for removing a hollow plunger from a well pump barrel after the barrel has had elongated slots cut along its length.

SUMMARY OF THE INVENTION

The subject invention helps reduce the cost of oil field pump maintenance by providing for the salvaging of pump barrels and pump plungers used in oil field plunger type pumps.

The well pump breaking tool is easy to operate, rugged in construction, and can be used with various sizes of tubing, pipe and pump barrels for quickly removing the tubing and barrels surrounding a pump plunger which has been seized due to contamination in the fluid pumped.

The invention eliminates the need of trying to free the plunger in the pump barrel with mechanical force or treating the plunger with expensive chemical solutions to dissolve the contaminates.

The well pump breaking tool for engaging an upper and lower elongated slot cut along the length of a barrel of a well pump includes a base plate with a first and second vertical arm mounted on opposite sides of the plate and extending upwardly. A well pump support is mounted above the center of the base plate and may be adjusted vertically. The support has a pointed protuberance extended upwardly for receipt in the lower slot of the barrel. A first and second bolt collar are mounted on top of the vertical arms and are angled downwardly toward the center of the base plate. A first and second adjustment bolt is received in the first and second collar. A first and second well pump jaw having pointed end portions are attached to the adjustment bolts. The pointed end portions of the jaws are received against the opposite sides of the upper slot in the barrel. By threading the adjustment bolts downwardly the pointed end portions apply pressure on the sides of the upper slots until the barrel is broken along the length of the upper slot thereby releasing the hollow plunger from the barrel.

The advantages and objects of the invention will become evident from the following detailed description when read in conjunction with the accompanying drawings which illustrate the preferred embodiments of the invention.

DETAILED DESCRIPTION OF THE DRAWINGS

Figure 1:
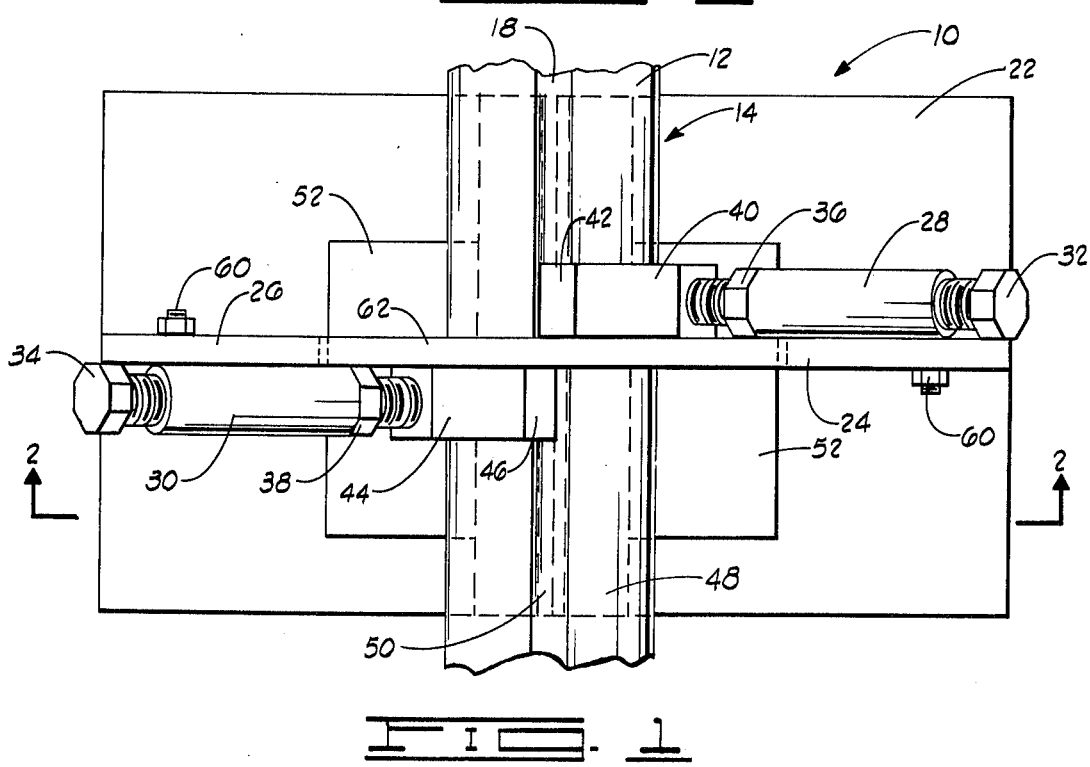
FIG. 1 is a top view of the well pump breaking tool shown receiving a portion of a barrel of a well pump with a hollow plunger inside the barrel.

In FIG. 1 the well pump breaking tool is designated by general reference numeral 10. The breaking tool 10 is adapted for receipt on top of a well pump breaking stand or any other device which can hold the tool 10 rigidly in place.

The tool 10 is used for breaking apart a barrel 12 of a well pump 14. The barrel 12 surrounds a hollow plunger 16 shown in FIG. 2. The tool 10 is also used in conjunction with the well pump stripping tool described in my co-pending patent application Ser. No. 915,789. The stripping tool is used for cutting elongated slots in the barrel 12 of the well pump 14. The slots include an upper slot 18, and a lower slot 20 which is approximately 180 degrees apart on the circumference of the barrel 12.

The well pump breaking tool 10 includes a flat horizontal base plate 22. Extending upwardly from the base plate 22 and on opposite sides of the plate 22 are a first vertical arm 24 and second vertical arm 26. Attached to the top of the first vertical arm 24 and second vertical arm 26 are a first bolt collar 28 and a second bolt collar 30. A first adjustment bolt 32 and a second adjustment bolt 34 are slidable received in the collars 28 and 30. The bolts 32 and 34 are adjusted and secured to the collars 28 and 30 by a first adjustment bolt 36 and a second adjustment bolt 38. The ends of the bolts 32 and 34 are received in a first well pump jaw 40 having a pointed end portion 42 and a second well pump jaw 44 having a pointed end portion 46. The pointed end portions 42 and 46 are received against the sides of the upper slot 18 in the barrel 12.

Figure 2:
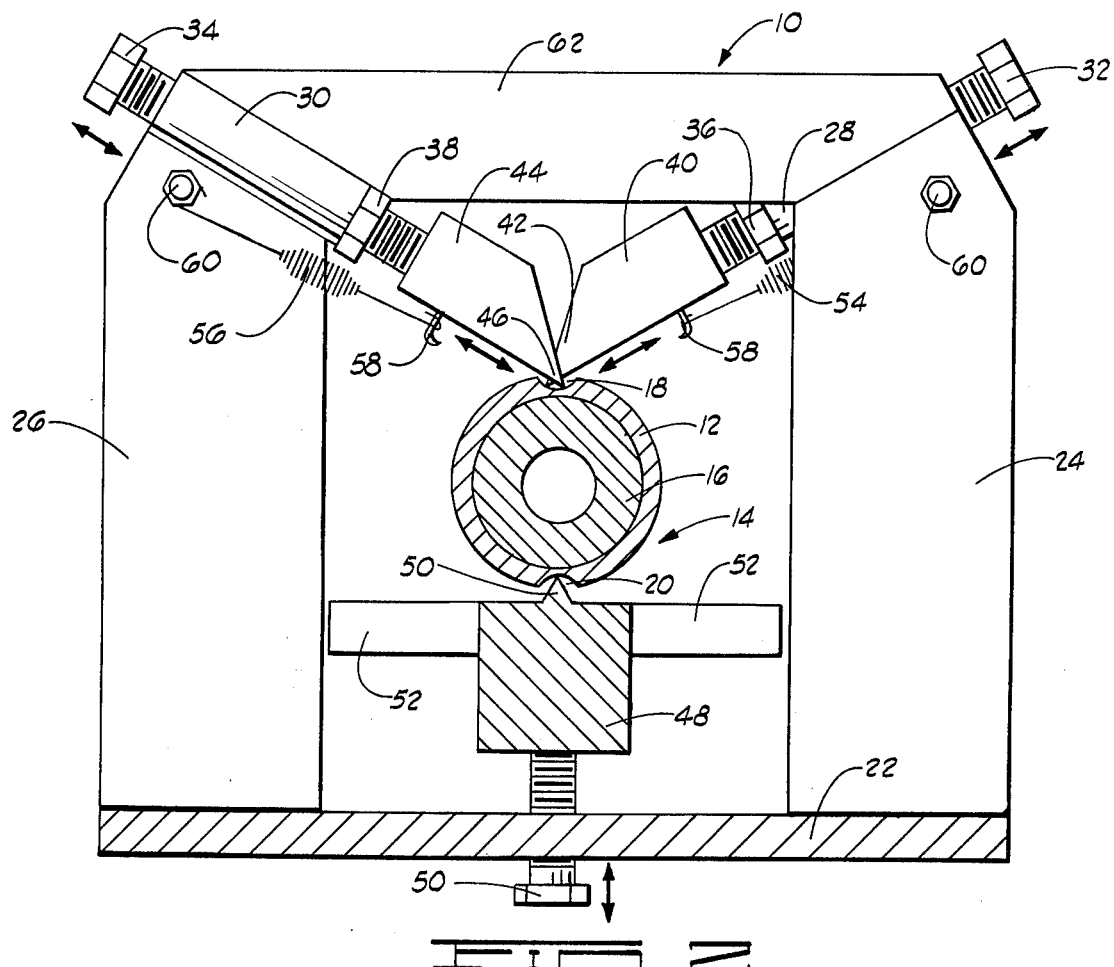
FIG. 2 is a front view of the well pump breaking tool taken along lines 2—2 shown in FIG. 1.

The well pump 14 rests on top of a well pump support 48 which is shown in dotted lines in FIG. 1 and in cross section in FIG. 2. The well pump support 48 includes a pointed protuberance 50 which extends upwardly from the support 48 and received in the lower slot 20 in the barrel 12.

The well pump support 48 is adjusted vertically above the center of the base plate 22 by a third adjustment bolt 50 which is threadably received through the center of the base plate 22 and secured to the bottom of the well pump support 48. By threading the third adjustment 50 upwardly and downwardly the tool 10 may receive various sizes of well pumps and well pump tubing.

The well pump support 48 is prevented from turning on the tool 10 by a well pump support guide 52 which extends outwardly from the sides of the support 48 with the ends of the guide 52 disposed adjacent the first vertical arm 24 and second vertical arm 26.

Referring now to FIG. 2, a first spring 54 and a second spring 56 can be seen attached at one end to hooks 58 which are attached to the jaws 40 and 44. The other ends of the springs 54 and 56 are attached to bolts 60. The bolts 60 are attached to the sides of the arms 24 and 26. The springs 54 and 56 insure that the pointed jaws 40 and 44 are held in place on the ends of the adjustment bolts 32 and 34.

The vertical arms 24 and 26 are held rigidly in place by a horizontal strap 62 which is welded to the top of the arms 24 and 26.

In operation the well pump breaking tool 10 is used after the well pump 14 has been slotted by the well pump stripping tool. The stripping tool cuts two elongated notches to a desired depth in the barrel 12. In the drawings the slots are shown as the upper slot 18 and the lower slot 20. From reviewing the cross section of the well pump 14 in FIG. 2 it can be seen that the upper and lower slots 18 and 20 are cut to a desired depth so that the outer circumference of the hollow plunger 16 is not cut and its finished surface is not damaged.

The slotted well pump 14 is then placed between the vertical arms 24 and 26 and underneath the strap 62 with the lower slot 20 received on top of the protuberance 50 of the well pump support 48. The adjustment bolts 32 and 34 are then threaded downwardly, thereby lowering the pointed end portions 42 and 46 of the jaws 40 and 44 into and against the sides of the upper slot 18. As the adjustment bolts 32 and 34 are continued to be threaded downwardly increased pressure is applied against the sides of the upper slot 18 until the barrel 21 is broken along the length of the upper slot 18 thereby releasing the hollow plunger 16 from inside the barrel 12. The hollow plunger 16 is then free for reconditioning and reuse in a well pump.

Changes may be made in the construction and arrangement of the parts or elements of the embodiments as described herein without departing from the spirit or scope of the invention defined in the following claims:

What is claimed is:

1. A well pump breaking tool for engaging an upper and lower elongated slot cut along the length of a barrel of a well pump, the barrel surrounding a hollow plunger, the well pump breaking tool comprising:
   a base plate;
   first and second vertical arms mounted on opposite sides of the base plate and extending upwardly therefrom;
   a well pump support mounted above the center of the base plate and between the first and second arms, the support having a pointed protuberance extending upwardly therefrom, the lower slot of the barrel received on top of the protuberance, the barrel and plunger resting thereon;
   first and second bolt collars mounted on top of the first and second vertical arms, the collars angled downwardly toward the center of the base plate;
   first and second adjustment bolts received in the first and second collar; and
   first and second well pump jaws having pointed end portions, the jaws attached to the adjustment bolts, the pointed end portions of the jaws received in the upper slot of the barrel, by threading the adjustment bolts downwardly the pointed end portions apply pressure on opposite sides of the upper slot until the barrel is broken along the length of the upper slot thereby releasing the hollow plunger from the barrel.

2. The well pump breaking tool as described in claim 1, further including a third adjustment bolt threadably received through the center of the base plate and attached to the bottom of the well pump support, by threading the third adjustment bolt upwardly and downwardly the well pump support is adjusted vertically on top of the base plate for receiving different sizes of well pumps.

3. The well pump breaking tool as described in claim 1, further including a first adjustment nut threadably attached to the first adjustment bolt and a second adjustment nut threadably attached to the second adjustment bolt for securing the bolts to the bolt collars.

4. The well pump breaking tool as described in claim 1, further including a first spring attached at one end to the first jaw with the other end attached to the first vertical arm and a second spring attached at one end to the second jaw with the other end attached to the second vertical arms, the springs applying tension on the jaws for holding the pipe jaws on the ends of the first and second adjustment bolts.

5. The well pump breaking tool as described in claim 1, further including a well pump support guide attached to the sides of the well pump support and extending outwardly therefrom, the ends of the guide disposed adjacent the first vertical arm and second vertical arm to prevent the support from turning on the base plate when pressure is applied to the barrel of the well pump.

6. A well pump breaking tool for engaging an upper and lower elongated slot cut along the length of a barrel of a well pump, the barrel surrounding a hollow plunger, the well pump breaking tool comprising:
   a base plate;
   first and second vertical arms mounted on opposite sides of the base plate and extending upwardly therefrom;
   a horizontal strap, the ends of the strap attached to the top of the first and second vertical arm;
   a well pump support mounted above the center of the base plate and between the first and second arms, the support having a pointed protuberance extending upwardly therefrom, the lower slot in the barrel received on top of the protuberance, the barrel and plunger resting thereon;
   first and second bolt collars mounted on top of the first and second vertical arms, the collars angled downwardly toward the center of the base plate;
   first and second adjustment bolts received in the first and second collar;
   first and second well pump jaws having pointed end portions, the jaws attached to the adjustment bolts, the pointed end portions of the jaws received in the upper slot of the barrel, by threading the adjustment bolt downwardly the pointed end portions apply pressure on opposite sides of the upper slot until the barrel is broken along the length of the upper slot thereby releasing hollow plunger from the barrel; and
   a third adjustment bolt threadably received through the center of the base plate and attached to the bottom of the well pump support, by threading the third adjustment bolt upwardly and downwardly the well pump support is adjusted vertically on top of the base plate for receiving different sizes of well pumps.

\* \* \* \* \*